UNITED STATES PATENT OFFICE.

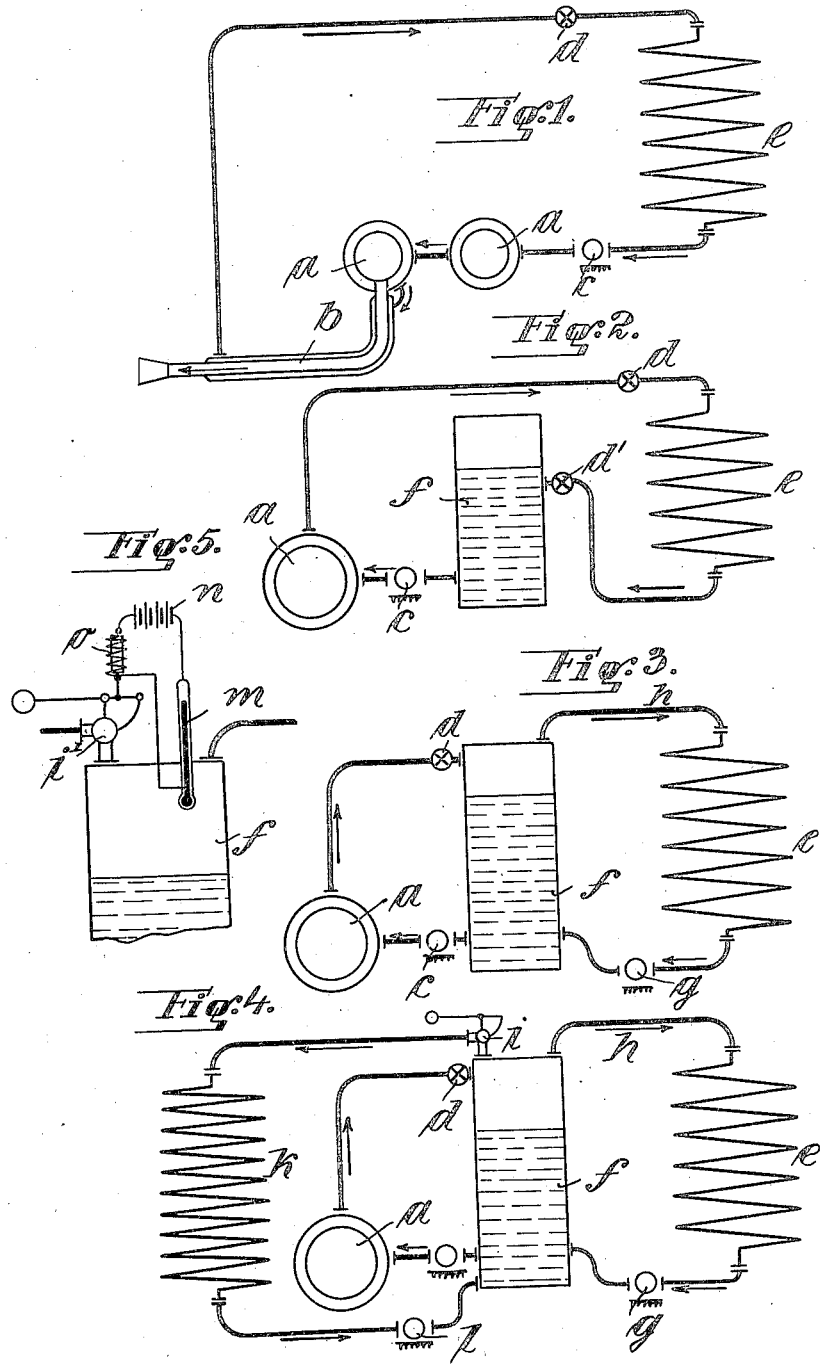

CARL SEMMLER, OF WIESBADEN, GERMANY.

UTILIZATION OF THE WASTE HEAT OF COMBUSTION-MOTORS FOR HEATING PURPOSES.

1,107,368.  Specification of Letters Patent.  Patented Aug. 18, 1914.

Application filed February 4, 1914. Serial No. 816,500.

*To all whom it may concern:*

Be it known that I, CARL SEMMLER, a subject of the King of Prussia, residing at 20 Mainzerstrasse, Wiesbaden, in the German Empire, have invented certain new and useful Improvements in or Pertaining to the Utilization of the Waste Heat of Combustion-Motors for Heating Purposes, of which the following is a specification, reference being had to the accompanying drawings.

This invention relates to the utilization of the waste heat of combustion motors for heating purposes. Proposals have already been made to utilize in this manner the cooling water employed in connection with such motors, but no satisfactory result has been attained, since it has not in general been found practicable to insure the uniform and reliable consumption of heat, or to prevent occasional rise of temperature and development of steam, which has a most prejudicial effect on the cylinders and frequently results in their fracture. These defects are especially noticeable when the heating plant is worked only at certain times and when the water circuits are not closed as scale and dirt then become deposited in the cooling jackets and considerably interfere with the cooling action.

Since the production of Diesel motors as the motive power for railway trains the question of heating has become one of great practical importance, as it has become necessary while using the Diesel motors for motive power to install special heating plant on passenger trains. The use of combustion motors for the propulsion of ships, moreover, opens up a wide field for the utilization of their waste heat for heating purposes. Now, by means of the present invention it is rendered practicable, no matter how irregular may be the use of the heating plant, to bring about the efficient and uniform cooling of the combustion motors, that is to say, of the cylinders and the exhaust, with the result that the risk of the bursting of the cylinders need no longer be seriously considered. To this end, the heat-conveying liquid is caused to circulate in a closed circuit, comprising a portion herein termed the heat-absorbing portion, which includes the cooling jackets of the combustion motors and in which the liquid is heated, and a portion herein termed the heat-delivering portion, wherein the liquid is cooled and its heat utilized or dissipated; and the liquid is forced through the former portion at a speed and pressure so high as entirely to prevent the development of steam therein. The pressure may be reduced according to requirements in the heat-delivering part of the circuit, and it is obviously quite immaterial in what manner the waste heat may be withdrawn from the combustion motor, whether from the working cylinders, from the hollow-walled exhaust pipe, or from the exhaust gases themselves, or to what purpose such waste heat may be applied.

The accompanying drawings diagrammatically illustrate various examples of apparatus in accordance with this invention.

Figure 1 shows a heating plant having a closed circuit; the exhaust and the water jackets of a pair of cylinders being indicated; Fig. 2 shows a modified construction of apparatus wherein there is provided an accumulator, while the combustion motor plant is represented by a single water jacket; Fig. 3 shows an arrangement in which the heat absorbing and the heat-delivering portions of the closed circuit have an accumulator interposed between them; Fig. 4 illustrates an arrangement wherein in addition to that portion of the closed circuit which contains the heating plant, there is provided an auxiliary return circuit by means of which the cooling of the circulating water is effected when the heating plant is not in use, and Fig. 5 is a detail drawing illustrating modified means for controlling the valve of said return circuit.

Referring now to the drawings: In Fig. 1, *a* indicates the cylinders of a combustion motor, which are surrounded by cooling jackets; while *b* indicates the exhaust outlet from these cylinders. A cooling liquid, such for instance as water, and preferably distilled water, to prevent the formation of scale, is driven by means of a pump *c* or the like through the cooling jackets of the cylinders *a* and the exhaust outlet *b*. At *d* there is provided a regulating device such as a throttle or reducing valve, by means of which the pressure or speed can be so adjusted as to prevent any formation of steam in the part *c a b d* of the circuit. The heat-conveying medium, after passing through the device *d*, reaches the heating plant *e* in the heat-delivering portion of the circuit, in which the giving off of heat takes place, and thence returns to the pump $c$. According to circumstances, the fall of pressure in the part $d\ e\ c$ of the closed circuit may or not be sufficient to permit of the formation of steam in the heat-delivering part of the circuit. Generally it will be found advantageous to maintain the heating plant $e$ at a lower pressure, in order to relieve the pipes and to prevent the risk of any of them bursting. As the same liquid constantly circulates through the closed circuit, it is of course impossible that any scale should be precipitated, and the transfer of heat consequently remains uniform.

In the arrangement illustrated in Fig. 2, the jacket of the combustion motor $a$ is supplied with the cooling liquid by means of the pump $c$. The regulating device $d$ serves to increase the pressure in the heat-absorbing part of the closed circuit including the motor $a$. The heating plant $e$, as shown, is arranged between this regulating device and another similar device $d'$, which permits of a further fall of pressure in the accumulator, accompanied by evolution of steam. It is however possible to dispense with one of these devices. The varying demand made on the heat-circulating liquid by the heat-absorbing and heat-delivering parts of the system is compensated by means of an accumulator $f$.

In the arrangement illustrated in Fig. 3, the accumulator $f$ is so arranged that the cold liquid is drawn off from the lower part of the accumulator by the pump $c$, superheated by passage through the jacket of the motor $a$, and then passed through the regulating device $d$ into the upper part of the accumulator $f$ where, if desired, it may give off steam. The heat-conveying liquid passes from the accumulator, through the pipe $h$, to the heating plant $e$ and is thence returned to the accumulator by means of the pump $g$.

In the arrangement shown in Fig. 4, there is provided an auxiliary heat-delivering circuit, to which, when the pressure in the accumulator $f$ increases beyond a certain limit in consequence of the heating plant being wholly or partially inoperative, the heat-conveying medium is admitted through a valve $i$ in the accumulator, resembling a safety valve, and adapted to be opened by the excess of pressure. This auxiliary circuit includes a cooling device $k$ of any suitable kind whence the cooled medium is returned by means of a pump $l$ into the accumulator $f$. While the heat in the heat delivering part $h\ e\ g$ of the closed circuit is usefully employed for heating purposes, the part $i, k, l$ of the closed circuit, situated in parallel with the part $h\ e\ g$ serves only for the purpose of dissipating heat in order that the necessary cooling of the combustion motor may be effected even when the heating plant $e$ is out of action. This arrangement is of special importance in the case of vehicles such as railway trains drawn by a Diesel locomotive and in which the number of carriages to be heated is subject to considerable variation. As none of the heat-conveying liquid must be lost in the excess pressure portion of the circuit, it is of great importance that the entire operation should take place in a closed circuit.

The automatic action of the portion $i\ k\ l$ of the closed circuit need not necessarily be brought about by means of a rise of pressure, but it may also be brought about by a rise of temperature. To this end there may be provided as shown in Fig. 5, an electrical contact thermometer $m$ or like thermostatic device, which effects the adjustment of the valve $i^1$ by closing the circuit of a local battery $n$ and thus energizing an electromagnet $o$ to open the valve.

What I claim is:—

1. Apparatus for utilizing the waste heat of a combustion motor having a cooling jacket, comprising heat-utilizing means, a closed circuit including said cooling jacket and heat-utilizing means and adapted to contain a heat-carrying medium, means for circulating said medium within said circuit, and pressure-reducing means provided in said circuit between the jacket and heat-utilizing means, the pressure-reducing means maintaining a pressure of the medium in advance of said last named means and within the heat-utilizing means that is less than that maintained back of said pressure-reducing means and within the jacket.

2. Apparatus for utilizing the waste heat of a combustion motor having a cooling jacket, comprising heat-utilizing means, a closed circuit including said cooling jacket and heat-utilizing means and adapted to contain a heat-carrying medium, pressure-reducing means provided in said circuit between the jacket and heat-utilizing means, and means provided in said circuit in advance of the heat-utilizing means for circulating said medium within said circuit, the jacket, pressure-reducing means, heat-utilizing means and medium-circulating means being thus consecutively passed by the medium during each cycle thereof, whereby the pressure of said medium maintained within the heat-utilizing means is less than that maintained within the jacket.

3. Apparatus for utilizing the waste heat of a combustion motor having a cooling jacket, comprising heat-utilizing means, a closed circuit including said cooling jacket and heat-utilizing means and adapted to contain a heat-carrying medium, pressure-reducing means provided in said circuit between the jacket and heat-utilizing means, and a pump provided in said circuit between the heat-utilizing means and the jacket for circulating the medium within said circuit, the jacket, pressure-reducing means, heat-utilizing means and pump being thus consecutively passed by the medium during each cycle thereof.

4. Apparatus for utilizing the waste heat of a combustion motor having a cooling jacket, comprising an accumulator, a closed circuit including said jacket and accumulator and adapted to contain a heat-carrying medium, means for circulating said medium within said circuit, and a throttle valve provided in said circuit between the jacket and accumulator, said valve maintaining such a pressure within the circuit portion located back of said valve and including the jacket as to prevent vaporization of said medium therein.

5. Apparatus for utilizing the waste heat of a combustion motor having a cooling jacket, comprising an accumulator having a water space and a steam space, heat-utilizing means, a closed circuit comprising consecutively the jacket, the steam space of the accumulator, the heat utilizing means, and the water-space of the accumulator, a pressure-reducing device provided in said circuit between the jacket and steam space of the accumulator, a first pump provided in the circuit between the heat-utilizing means and the water space of the accumulator, and a second pump provided in the circuit between said last named space and the jacket.

6. Apparatus for utilizing the waste heat of a combustion motor having a cooling jacket, comprising an accumulator having a water space and a steam space, heat-utilizing means, a closed circuit comprising consecutively the jacket, the steam space of the accumulator, the heat-utilizing means, and the water-space of the accumulator, a pressure-reducing device provided in said circuit between the jacket and steam space of the accumulator, a first pump provided in the circuit between the heat-utilizing means and the water space of the accumulator, a second pump provided in the circuit between said last named space and the jacket, a heat-dissipating device, an auxiliary circuit including said heat-dissipating device and the accumulator, and means for establishing said auxiliary circuit upon a shutting down of that portion of the first named circuit that embraces the heat-utilizing means.

7. Apparatus for utilizing the waste heat of a combustion motor having a cooling jacket, an accumulator having a water space and a steam space, heat-utilizing means, a closed circuit comprising consecutively the jacket, the steam space of the accumulator, the heat-utilizing means, and the water-space of the accumulator, a pressure-reducing device provided in said circuit between the jacket and steam space of the accumulator, a first pump provided in the circuit between the heat utilizing means and the water space of the accumulator, a second pump provided in the circuit between said last named space and the jacket, a heat-dissipating device, an auxiliary circuit including said heat-dissipating device and the accumulator, and means for establishing said auxiliary circuit upon an excessive increase of pressure in the first named circuit.

In testimony whereof I have hereunto affixed my signature in presence of two witnesses.

CARL SEMMLER.

Witnesses:
WOLDEMAR HAUPT,
HENRY HASPER.